United States Patent [19]
Beach

[11] 3,750,545
[45] Aug. 7, 1973

[54] FILM METERING DEVICE FOR ROLL FILM CAMERAS

[75] Inventor: David E. Beach, Rochester, N.Y.

[73] Assignee: Eastman Kodak Company, Rochester, N.Y.

[22] Filed: Aug. 21, 1972

[21] Appl. No.: 282,629

[52] U.S. Cl. .......................... 95/31 FM, 95/31 FL
[51] Int. Cl. .......................................... G03b 19/04
[58] Field of Search ..................... 95/31 FM, 31 FL, 95/31 R; 242/71.4

[56] References Cited
UNITED STATES PATENTS
| | | | |
|---|---|---|---|
| 3,603,236 | 9/1971 | Engelsmann | 95/31 FM |
| 3,682,066 | 8/1972 | Simon | 95/31 FM |
| 3,628,432 | 12/1971 | Ettischer | 95/31 FM |
| 3,148,605 | 9/1964 | Peterson et al. | 242/71.4 X |

Primary Examiner—Richard L. Moses
Attorney—W. H. J. Kline et al.

[57] ABSTRACT

A camera for roll film having perforations at predetermined metering intervals includes a transport mechanism for advancing the film along an exposure plane and a metering mechanism having an active condition for stopping film transport when the film is correctly positioned for exposure and an inactive condition. A film sensing pawl is mounted for movement between a retracted position resting on the film surface, an extended position transversing the film while in a film perforation and a metering position spaced from the extended position in the direction of film advancement. When moved to its metering position by advancing film, the sensing pawl actuates the metering mechanism to disable the transport mechanism. A resilient force is applied to the sensing pawl in a direction urging the pawl from its metering position toward its extended position. The force on the sensing pawl is sufficient to cause the film to move in a direction opposite to the direction of film advancement after the transport mechanism has been disabled to accurately back the film to a position for exposure. Once backed to its extended position, the sensing pawl engages a stop to relieve the spring force on the film.

4 Claims, 4 Drawing Figures

FILM METERING DEVICE FOR ROLL FILM CAMERAS

CROSS-REFERENCE TO RELATED APPLICATION

Reference is made to my coassigned, copending U.S. application Ser. No. 203,524 entitled "Film Metering Mechanism for Cameras" filed Dec. 1, 1971.

BACKGROUND OF THE INVENTION

1. Field of the Invention

The present invention relates to cameras having means for detecting the presence of a film perforation to selectively lock and release the film transport mechanism, and more particularly to such cameras having means for accurately positioning the film for exposure and for minimizing any surge of surge of force from the detecting means on the film during an exposure interval.

2. Description of the Prior Art

The present invention is an improvement over cameras of the type disclosed in my copending, coassigned U.S. Pat. application Ser. No. 203,524, entitled "Film Metering Mechanism for Cameras" filed Dec. 1, 1971. In the camera therein disclosed, a metering lever is movable between an inactive position and an active position disabling the camera's film transport mechanism. A film sensing pawl is mounted for movement from a retracted position engaging the film surface, through an extended position transversing the film when intercepting one of the film perforations, and to a metering position spaced from the extended position in the direction of film advancement by the trailing edge of the perforation as the film is advanced. The film sensing pawl and the metering lever are associated such that the metering lever is moved to its active position upon movement of the sensing pawl to its metering position toward its extended position, and, since the metering pawl remains in the film perforation during an exposure, the spring force is applied also to the trailing edge of the film perforation. This force on the film is opposed by frictional forces between camera elements and between the film and camera and/or cartridge surfaces. When the shutter is tripped, minor vibrations travel through the camera. These vibrations may relieve static friction wherever it occurs within the camera. Loss of frictional forces restraining the film can cause the spring force on the film from the pawl to move the film during exposure.

Further, cameras of the type described in my above-mentioned copending application may be susceptible to slight inaccuracies in positioning the film when the transport mechanism is disabled. One cause of possible inaccuracies results from the time lag inherent in such cameras between the instant when the sensing pawl detects the presence of a perforation at the metering position and the actuation of the metering mechanism to disable the film transport. Since a lever of the metering mechanism must move to engage the teeth of a pinion in the transport mechanism before the transport mechanism can be disabled, the period of time required to so move the lever permits additional, undesired movement of the film beyond its correct position. Such undesired movement is a function of the speed at which the film is being advanced. Therefore, the amount of movement cannot be accurately predicted during the design of the camera.

Another cause of undesired, additional film movement beyond the correct position for exposure is the inertia of the film as it is advanced along the camera's exposure plane. After the transport mechanism has been disabled, film may continue to move independent of the transport mechanism until it is stopped by frictional forces in the camera and/or cartridge. Once again, the amount of such movement is a function of the film's speed at the time that the transport mechanism is metered.

SUMMARY OF THE INVENTION

It is an object of the present invention to reduce or eliminate the possibility of film movement during the exposure period by eliminating the force of the film sensing pawl on the trailing edge of the film perforation during a picture-taking operation when the camera vibrations relieve frictional restraints.

It is another object of the present invention to provide for accurate registration of the film along the camera's exposure plane when the transport mechanism has been metered.

In the preferred embodiment of the present invention, these objects have been accomplished by providing for the film to be advanced past the position of accurate registration and then to back the film to the correct position whereat the film sensing pawl engages a stop in the camera so that the spring force on the sensing pawl is not transmitted to the trailing edge of the film perforation.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
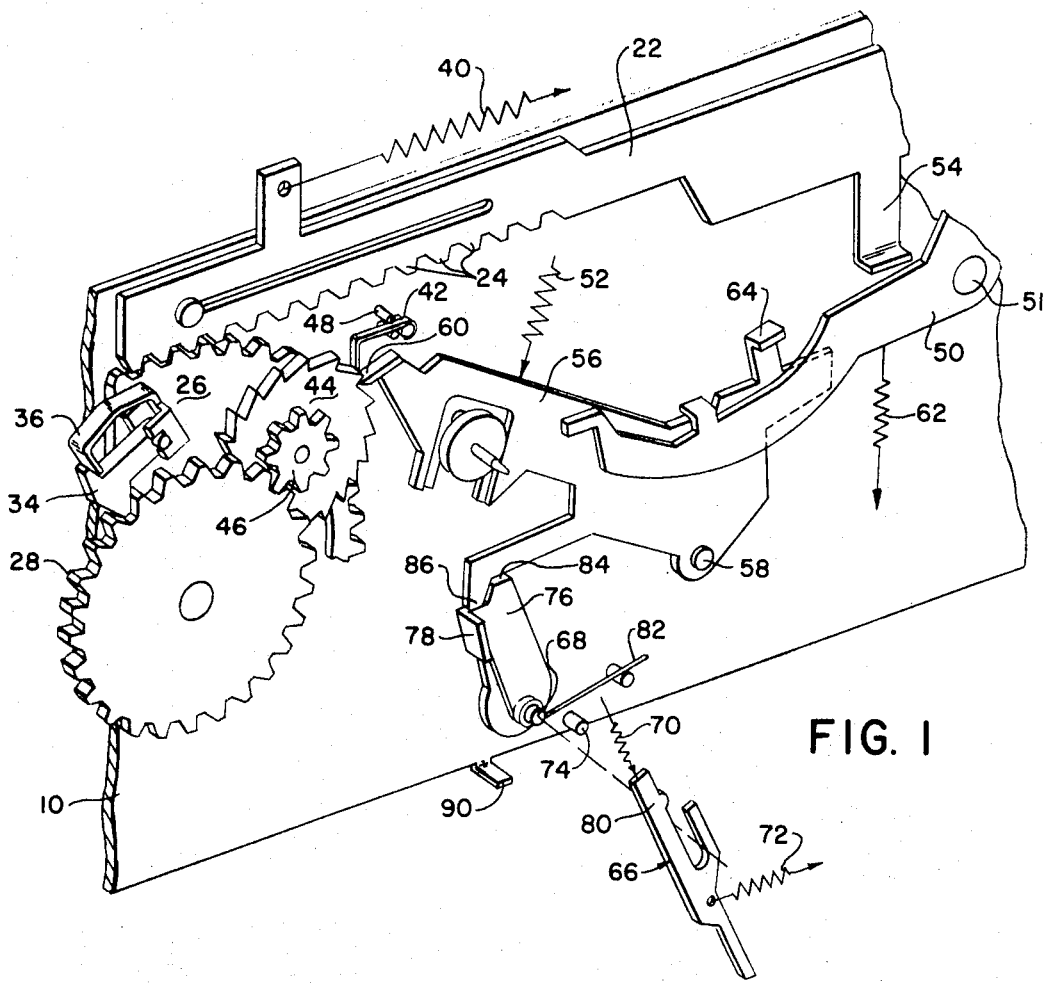
FIG. 1 is an exploded perspective view of a portion of a camera in accordance with the present invention, the camera elements being shown in their positions when the camera is ready to be operated to make an exposure.

Because cameras are well known, the present description will be directed in particular to elements forming part of, or cooperating more directly with apparatus in accordance with the present invention. It is to be understood that camera elements not specifically shown or described may take various forms well known to those skilled in the art.

Referring to the drawings, the camera illustrated includes a mechanism plate 10 and is adapted to receive roll film 12 perforated at predetermined metering intervals, such as at 13 and 14. The film may be contained in a cartridge, not shown, of the type shown in coassigned U.S. Pat. No. 3,138,081 which issued on June 23, 1964 to Hubert Nerwin.

A film advance slide member 22 is reciprocally mounted on mechanism plate 10 by a pin-in-slot arrangement. The slide member has a rack with a plurality of teeth 24 in meshing engagement with the teeth of a gear sector 26 coaxially rotatable with a gear 28. Rotation of gear 28 in the direction of arrow 30 winds film in the direction of arrow 32. Gear 28 has teeth in meshing engagement with a ratchet pawl 34 rotatably mounted on gear sector 26 and biased by a spring 36 into engagement with the teeth of gear 28 so that upon movement of slide member 22 in the direction of arrow 38 in FIG. 2, rotary movement of gear sector 26 is transmitted to rotate gear 28 in the direction of arrow 30, thereby advancing film along the camera's exposure plane in the direction of arrow 32. As slide member 22 is returned to the right by a spring 40, gear 28 is prevented from rotating freely in a counterclockwise direction by a leaf spring 42 which cooperates with the teeth on a ratchet wheel 44 on a gear 46 in meshing engagement with gear 28. However, as can be seen from the drawings, slight reverse rotation of the gear train is permitted until leaf spring 42 is backed into contact with a stud 48 extending from mechanism plate 10. The purpose of this reverse rotation will be fully described hereinafter.

A shutter release lever 50 is pivotally mounted at 51 on mechanism plate 10 and may be rotated in a clockwise direction against the force of a spring 52. Clockwise movement of shutter release lever 50 unlatches a high energy lever, not shown, to trip the shutter as fully described in my above-mentioned, copending application. Also, the high energy lever is cocked, as described in that application, by a projection 54 on slide 22 as the slide is moved in a direction of arrow 38.

A metering lever 56 is rotatably carried on mechanism plate 10 by a stud 58 and carries a metering pawl 60 urged toward an active position in engagement with the teeth of ratchet 44 by a spring 62 to prevent counterclockwise rotation of gear 28. A tab 64 on metering lever 56 is in alignment with the camera's high energy lever, not shown, to rotate the metering lever in a clockwise direction about stud 58 when a picture is taken, thereby removing pawl 60 from ratchet 44.

A film sensing pawl 66 is mounted for rotational and longitudinal movement on a stud 68 and is urged by a spring 70 toward film 12. A second spring 72 urges the sensing pawl in a counterclockwise direction into engagement with a stud 74. Spring 72 is somewhat stronger than springs ordinarily used in such applications, and the purpose of using a stronger spring will be explained below. A control member 76 is also rotatably carried by stud 68 and is provided with a tab 78 for engagement with an arm 80 of the sensing pawl to be rotated thereby when the sensing pawl is rotated in a clockwise direction as will be explained hereinafter. Such rotation is resiliently opposed by a wire spring 82 pressing against tab 78. The control member has a surface 84 aligned with a tab 86 on metering lever 56 to prevent engagement of ratchet 44 by metering pawl 60 until the control member is rotated clockwise by the sensing pawl.

OPERATION

Figure 2:
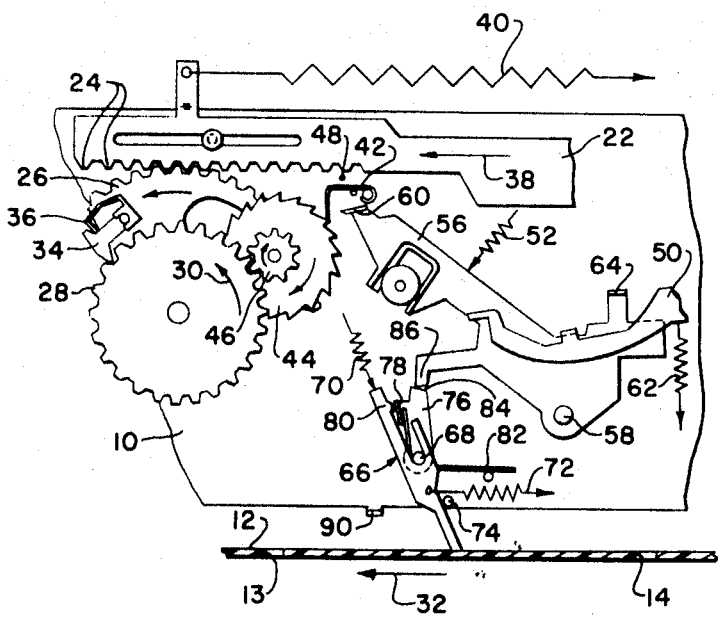
FIG. 2 is a view of the portion of the camera of FIG. 1 showing the camera elements as film is being advanced along the camera's exposure plane.

FIG. 2 shows the elements of the camera in their respective positions following the exposure of a film frame, the film transport mechanism having begun to transport film to the next frame. Metering lever 56 has been placed in its inactive condition by the high energy lever whereat the metering lever is latched by surface 84 of control member 76. Slide 22 is being moved in the direction of arrow 38 to rotate the transport mechanism gear train to advance film in the direction of arrow 22. Sensing pawl 66 has been cammed from perforation 13 by a projection 90 as explained in the above-identified copending application, and it has been returned to rest upon pin 74 by spring 72. The sensing pawl is urged against the surface of film 12 ready to detect the arrival of perforation 14 thereat.

Figure 3:
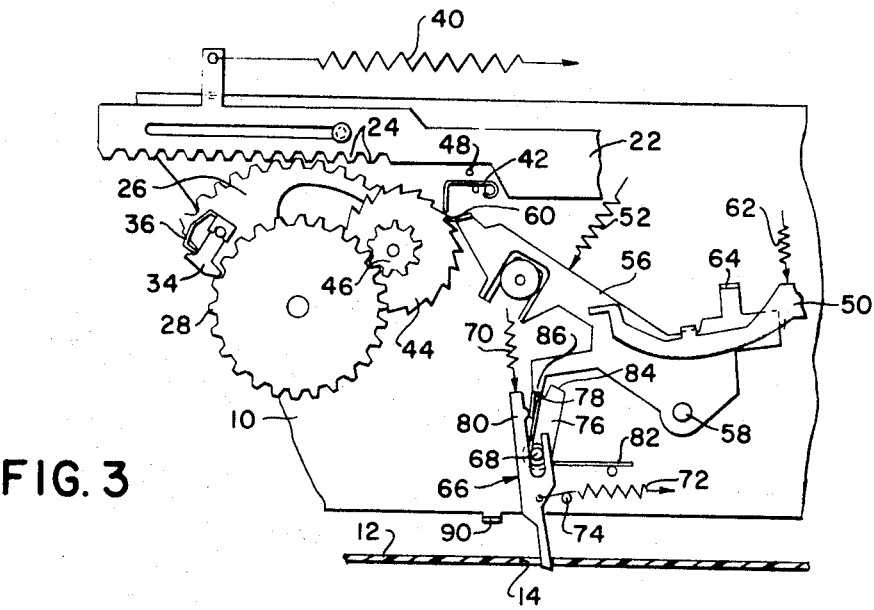
FIG. 3 is a view similar to FIG. 2 showing the camera elements immediately following actuation of the film transport metering mechanism.

When perforation 14 reaches the sensing pawl, the pawl is moved linearly into the perforation to transverse the film. Continued movement of slide 22 further advances film 12 so that the trailing edge of perforation 14 rotates sensing pawl 66 in a clockwise direction away from pin 74 to a metering position shown in FIG. 3. As the sensing pawl rotates, its arm 80 engages tab 78 of control member 76 to rotate the control member, thereby removing surface 74 from beneath tab 76 of metering lever 56. Spring 52 is then free to rotate the metering lever in a counterclockwise direction about pin 58 to lower metering pawl 60 into ratchet 44, thereby preventing further rotation of the film transport mechanism gear train.

Figure 4:
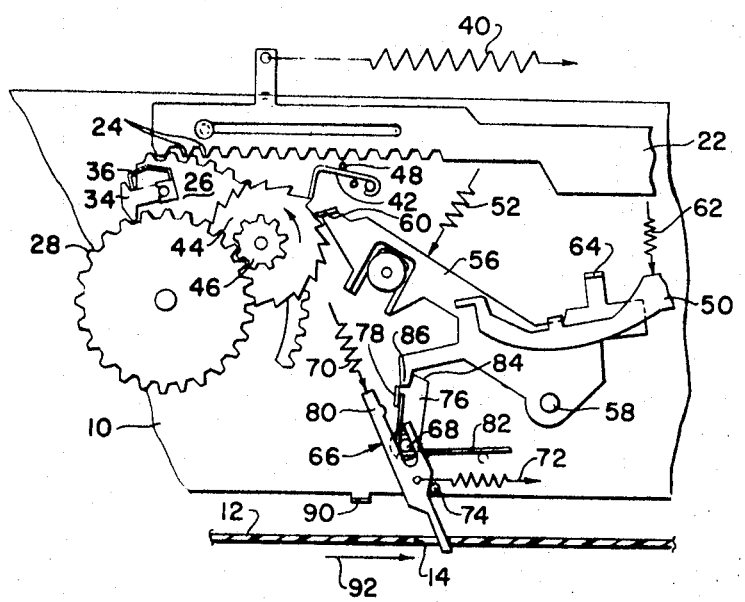
FIG. 4 is a view similar to FIGS. 2 and 3 showing the camera elements when the camera is ready to be operated to make an exposure.

At this point, film 12 has been advanced past its proper registration position with the camera's exposure area. As slide 22 is returned to the right from its FIG. 3 to its FIG. 4 position, the transport mechanism gear train is permitted to rotate slightly in a direction opposite to that to which it has been rotating by the flexure of leaf spring 62 until the leaf spring engages pin 48. During such reverse rotation, spring 72 rotates sensing pawl 66 in a counterclockwise direction about post 68 until the sensing pawl engages the pin 74. The sensing pawl acts against the trailing edge of perforation 14 to move the film in the direction of arrow 92 until the film has backed up into proper registry with the camera's exposure area. Thus, it can be seen that spring 72 must be of sufficient strength to overcome frictional restraints tending to prevent such backing up of the film. In this way, the position of the film is accurately determined by cooperation of sensing pawl 66 and pin 74 so that each and every film frame will be accurately positioned within the camera. Further, since the film sensing pawl is in engagement with pin 74, the force of spring 72 is not transmitted through the pawl to the trailing edge of perforation 14. In this way, there is no force on the film which might cause undesired film movement during the interval when the shutter is activated, thereby eliminating the risk of film movement during exposure.

The invention has been described in detail with particular reference to a preferred embodiment, but it will be understood that variations and modifications can be effected within the spirit and scope of the invention.

I claim:

1. In a camera adapted to receive roll film perforated at predetermined metering intervals and having (1) transport means for advancing received film in a first direction across the camera's exposure plane, (2) a film sensing pawl movable by advancing film from a first position extending into a film perforation advanced into alignment therewith to a second position spaced from said first position along said exposure plane generally in said first direction, and (3) metering means associated with said transport means and said sensing pawl for disabling said transport means when said sensing pawl is moved to its second position, the improvement comprising spring means, urging said sensing pawl from its second position toward its first position, for moving received film in the direction opposite to said first direction after said transport means has been disabled.

2. The improvement as defined in claim 1 further comprising stop means in the path of said sensing pawl for limiting the amount of such travel of said sensing pawl in said opposite direction, whereby the film will be accurately registered in said exposure plane.

3. The improvement as defined in claim 1 further comprising means for opposing the force of said spring means after said sensing pawl has been returned to its first position, whereby said force is not transmitted by said sensing pawl to the film.

4. The improvement as defined in claim 3 wherein said force opposing means comprises stop means in the path of said sensing pawl for engagement by said sensing pawl to limit the amount of travel of said sensing pawl in said opposite direction.

* * * * *

PO-1050
(5/69)

UNITED STATES PATENT OFFICE
CERTIFICATE OF CORRECTION

Patent No. 3,750,545      Dated August 7, 1973

Inventor(s) David E. Beach

It is certified that error appears in the above-identified patent and that said Letters Patent are hereby corrected as shown below:

Column 4, line 61, after "intervals" insert --associated with related exposure frames--;

Column 4, line 63, after "across" insert --an exposure area in--;

Column 5, line 5, after "comprising" insert a colon --:--;

Column 5, line 8, after "direction" insert --to return the film exposure frame associated with the perforation to alignment with said exposure area--;

Column 5, line 8, after "disabled" insert --; and stop means for contacting said sensing pawl in opposition to the force of said spring means after said sensing pawl has been returned to its first position, said stop means being located along said exposure plane at a position such that the film exposure frame associated with the perforation is in proper alignment with said exposure area when said sensing pawl contacts said stop means.--

Column 5, line 9, Cancel lines 9-12;

Column 6, line 1, Cancel lines 1-6;

Column 6, line 7, change "Claim 3" to --Claim 1--.

Column 6, line 7, "4." should read -- 2. --.

On the cover sheet, after the abstract, "4 Claims" should read -- 2 Claims --.

Signed and sealed this 19th day of March 1974.

(SEAL)
Attest:

EDWARD M. FLETCHER, JR.
Attesting Officer

C. MARSHALL DANN
Commissioner of Patents